United States Patent
Chakrabarti

(10) Patent No.: US 9,208,080 B2
(45) Date of Patent: Dec. 8, 2015

(54) PERSISTENT MEMORY GARBAGE COLLECTION

(71) Applicant: Hewlett-Packard Development Company, L.P., Houston, TX (US)

(72) Inventor: Dhruva Chakrabarti, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 178 days.

(21) Appl. No.: 13/905,235

(22) Filed: May 30, 2013

(65) Prior Publication Data

US 2014/0359201 A1    Dec. 4, 2014

(51) Int. Cl.
*G06F 12/02*    (2006.01)

(52) U.S. Cl.
CPC ........ *G06F 12/0253* (2013.01); *G06F 12/0246* (2013.01)

(58) Field of Classification Search
CPC .......................... G06F 12/0253; G06F 12/0246
See application file for complete search history.

(56) References Cited

U.S. PATENT DOCUMENTS

| | | | |
|---|---|---|---|
| 5,920,876 A | 7/1999 | Ungar et al. | |
| 6,804,672 B1 * | 10/2004 | Klein et al. | 707/705 |
| 6,804,762 B1 * | 10/2004 | Dussud et al. | 711/170 |
| 8,856,186 B1 * | 10/2014 | Li et al. | 707/800 |
| 2003/0187888 A1 | 10/2003 | Hayward | |
| 2003/0220931 A1 * | 11/2003 | Sexton et al. | 707/100 |
| 2004/0122876 A1 * | 6/2004 | Hudson et al. | 707/206 |
| 2006/0173939 A1 * | 8/2006 | Yin et al. | 707/206 |
| 2009/0327377 A1 | 12/2009 | Ylonen | |
| 2011/0276776 A1 | 11/2011 | Ylonen | |
| 2013/0007073 A1 | 1/2013 | Varma et al. | |

OTHER PUBLICATIONS

Munro, D.S. et al., Incremental Garbage Collection of a Persistent Object Store Using PMOS, (Research Paper), Jan. 1998, 13 Pages.

* cited by examiner

*Primary Examiner* — Hiep Nguyen
(74) *Attorney, Agent, or Firm* — Trop, Pruner & Hu, P.C.

(57) ABSTRACT

A technique includes identifying a dependency between a first persistent memory region and at least one other persistent memory region. The technique includes using a process having access to the first persistent memory region to selectively perform garbage collection for the first persistent memory region based at least in part on whether the process has access to the other persistent memory region(s) from which the first persistent memory region depends.

20 Claims, 4 Drawing Sheets

PERSISTENT MEMORY GARBAGE COLLECTION

BACKGROUND

A computer system has traditionally contained both volatile and non-volatile storage devices. In this manner, due to their relatively faster access times, volatile memory devices, such as dynamic random access memory (DRAM) devices, have traditionally been used to form the working memory for the computer system. To preserve computer system data when the system is powered off, data has traditionally been stored in non-volatile mass storage devices associated with slower access times, such as magnetic media-based or optical media-based mass storage devices.

The development of relatively high density, solid state non-volatile memory technologies is closing the gap between the two technologies, and as such, non-volatile memory devices are becoming increasingly used to form a working, persistent memory for both traditional "memory" and "storage" functions.

DETAILED DESCRIPTION

A computer system may contain a working, persistent memory that is formed from non-volatile memory (NVM) devices, such as memristors, phase change memory devices, spin-torque transfer random access memory (STT-RAM) devices, and so forth. Memory accesses at the byte granularity using the NVM devices along with dynamic random access memory (DRAM)-like latencies of the NVM devices allow fine grain and efficient persistence of data through execution of regular central processing unit (CPU) store instructions.

For example implementations that are disclosed herein, the persistent memory contains data containers called, "persistent memory regions" (or persistent regions (PR) herein), which contain persistent data written to the regions by programs (i.e., written by processes created by the execution of machine executable instructions). When data are allocated from a persistent memory region, persistence and reliability of such data are maintained across machine reboots and failures. Therefore, if a failure, or fault, occurs in the computer system during program execution, for example, a recovery process may be transparently initiated on restart of the system to maintain consistency of the data in the persistent memory regions. To the contrary, data, which are not in a persistent memory region may be considered logically transient.

Systems and techniques are disclosed herein for purposes of performing garbage collection for a persistent memory region, which is dependent on at least one other persistent memory region. As further disclosed herein, this dependency may be caused by one or multiple pointers between/among one or multiple persistent memory regions. In this context, "garbage collection" refers to, in general, a process that involves reclaiming persistent memory data, which are not being used, thereby freeing allocated persistent memory space. The garbage collection techniques disclosed herein prevent or at least mitigate "memory leakage" in persistent memory, which refers to previously used but now unused locations, which are not accessible for purposes of future allocation.

Figure 1:
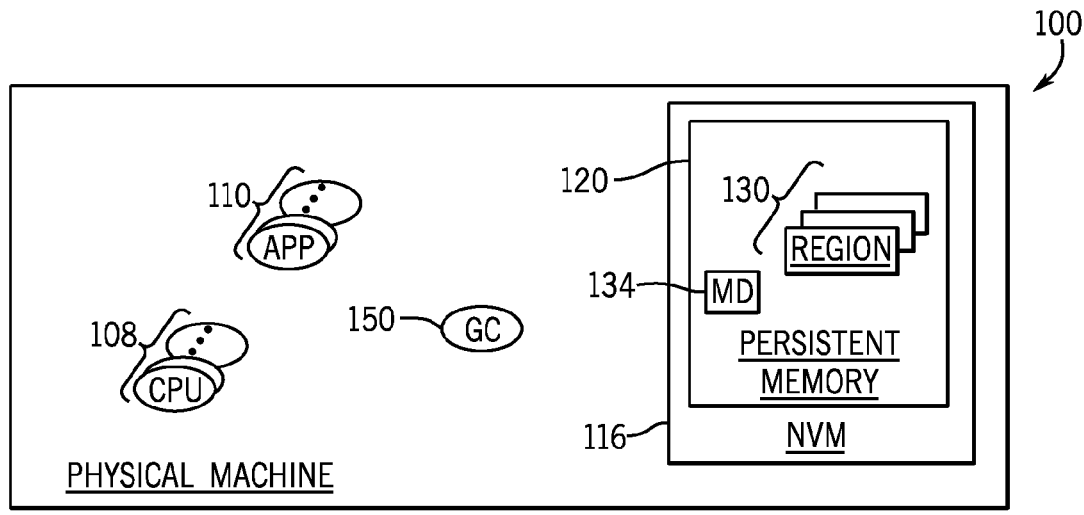
FIG. 1 is a schematic diagram of a physical machine according to an example implementation.

Referring to FIG. 1, as a more specific example, a physical machine 100 includes a non-volatile memory 116, which is formed from NVM devices. The non-volatile memory 116 contains a persistent memory 120. The persistent memory 120 has data containers, or "persistent memory regions 130."

In general, the physical machine 100 is an actual machine that is made up of actual hardware and actual machine executable instructions, or "software." In this manner, as depicted in FIG. 1, the physical machine 100 may include such hardware as one or more central processing units (CPUs) 108 and the NVM devices that form the non-volatile memory 116. Among its other hardware, as an example, the physical machine 100 may include various input/output (I/O) devices, network interface devices, and so forth, as can be appreciated by the skilled artisan.

As an example, the software of the physical machine 100 may include, as examples, machine executable instructions that when executed by the CPU(s) 108 form one or more corresponding applications 110. Moreover, the application(s) 110 correspond to one or more processes, which are executed on the physical machine 100. One or more of these processes may perform garbage collection, and as such, form an instance of a "garbage collector 150." The garbage collector 150, in general, is constructed to perform a garbage collection cycle, which takes into account any dependencies between the persistent memory regions 130.

In general, a persistent memory region 130, in accordance with example implementations, is defined by a range of virtual addresses, which are mapped to physical pages of the non-volatile memory 116. A given physical memory region 130 is named, thereby allowing the processes to create and retrieve persistent data for reuse and sharing.

In general, each persistent memory region 130 has an associated persistent root, which is located within the region 130 at a fixed offset, for the purpose of accessing data structures within the region 130. In general, the garbage collector 150 uses the persistent root to determine whether a given memory location within a given persistent memory region 130 may be garbage collected.

More specifically, the garbage collector 150 may perform two general types of garbage collection for a given persistent memory region 130. One type of garbage collection is "online garbage collection," which refers to a garbage collection that is performed on a given persistent memory region 130 when a process is currently executing and using the memory region 130. For online garbage collection, the garbage collector 150 reclaims, or recycles, data within the persistent memory region 130, which are not reachable from the associated persistent or program root.

"Offline garbage collection" refers to a garbage collection for a given persistent memory region 130, for which a process is not currently accessing the region 130, i.e., no process associated with the persistent memory region 130 is currently executing. In this manner, after a program fault, or crash, or when no process associated with the persistent memory region 130 is executing, the garbage collector 150 reclaims, or recycles, any data within the persistent memory region 130 that are reachable from the associated persistent root.

In general, the garbage collection that is performed by the garbage collector 150 aims to reclaim "holes" left within the persistent memory region 130, either because of system crashes or programmer-induced memory leaks.

Figure 2:
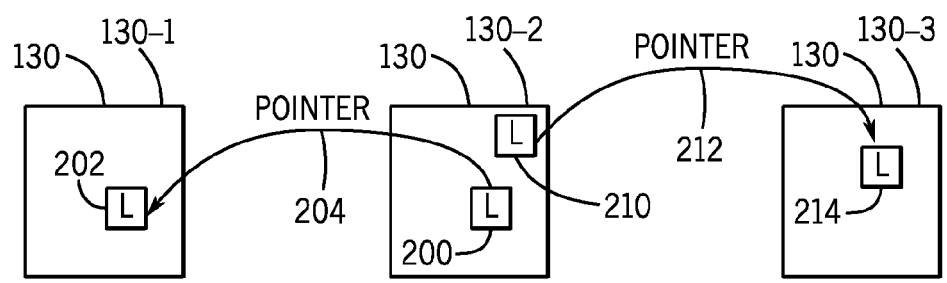
FIG. 2 is an illustration of dependent persistent memory regions of a persistent memory of FIG. 1 according to an example implementation.

Referring to FIG. 2 in conjunction with FIG. 1, the garbage collection disclosed herein recognizes that, in general, a given persistent memory region 130 may be dependent on at least one other persistent memory region 130. This is illustrated in FIG. 2 for the example in which a persistent memory region 130-2 depends on a persistent memory region 130-1. The dependency is due to a given process accessing and using multiple persistent memory regions 130 at a given time where a location in one persistent memory region points to a location in a different persistent memory region.

For example, the persistent memory region 130-1 may contain a tree data structure (as an example), which contains a corresponding example memory location 202. A given process may access the persistent memory region 130-2, and may also access the persistent memory region 130-1 through one or multiple pointers from region 130-2.

For example, a given location 200 of the persistent memory region 130-2 may access (via a pointer 204) a corresponding location 202 of the persistent memory region 130-1 associated with the tree data structure. The same process may also, via pointers, access other persistent memory regions 130.

FIG. 2 further illustrates an example memory location 210 of the persistent memory region 130-2 accessing (via a pointer 212) a memory location 214 of another persistent memory region 130-3. In this regard, as an example, the memory location 214 may be associated with a queue data structure. Thus, if a given process works on both a persistent list and a persistent tree, the process may operate on all three of the example persistent memory regions 130 that are depicted in FIG. 2.

The systems and techniques that are disclosed herein allow processes to use inter-persistent memory region pointers, while still allowing garbage collection. In this manner, the systems and techniques that are disclosed herein take into account the presence of inter-persistent memory region pointers. The corresponding garbage collection may be more complex for such a persistent memory region 130, as garbage collection in a persistent memory region 130 that depends on another persistent memory region 130 may not be performed in isolation.

For example, to perform garbage collection for the persistent memory region 130-1, the garbage collection accounts for some locations in the persistent memory region 130-1, such as example location 202, which are not being directly reachable from other locations in the persistent memory region 130-1. In this regard, the garbage collector 150 considers pointers to these locations, such as the example pointer 204 to the location 202, in the garbage collection process. The garbage collection is complicated by the fact that a given process may have explicitly opened the persistent memory region 130-1 alone, while the dependent persistent memory region 130-2 may concurrently be used by one or multiple other process(es).

In accordance with example implementations that are disclosed herein, the processes use locks (described herein) for purposes of arbitrating concurrent accesses to the persistent memory regions 130 in a manner that avoids data races. More specifically, in accordance with an example implementation, two processes may concurrently access a given persistent memory region 130 if the region 130 is accessed by both processes in a read only mode. For this read only mode, the persistent memory region 130 has an associated "read only lock."

The accessed persistent memory region 130 may be in a "read-write mode," which means that a process may read and write to the region 130 and has acquired a "read-write lock" on the region 130.

More specifically, the read and read-write locks may be defined as follows, in accordance with an example implementation. If a process opens a persistent memory region 130 in a read only mode, then a read only lock is automatically acquired on that persistent memory region 130 on behalf of that process. If a process opens a persistent memory region 130 in a read-write mode, a read-write lock is automatically acquired on that persistent memory region 130 on behalf of that process. A read lock or a read-write lock on a given persistent memory region 130 is automatically released when either the persistent memory region 130 is closed or the process that holds the lock terminates.

If a process attempts to open a persistent memory region 130 in a read only mode, which another process has secured with a read lock, the opening of that persistent memory region 130 is successful; and that process is added to the list of processes that have a read lock on the persistent memory region 130. If a process attempts to open a given persistent memory region 130 in a read-write mode, which has been secured by another process using either a read lock or a read-write lock, then this open operation is blocked until the read/read-write lock is released. If a process attempts to open a given persistent memory region 130 in a read only mode when the region 130 has been secured using a read-write lock, then this open operation is also blocked until the read-write lock is released.

As disclosed herein, the garbage collector 150 (see FIG. 1) performs garbage collection for a given, targeted persistent memory region 130 as follows. First, the garbage collector 150 attempts to trace the dependency(ies) if the region 130 is dependent on one or multiple other persistent memory regions. If the tracing of all of the dependent persistent memory regions 130 is permitted, i.e., if the garbage collector 150 may at least open the dependent persistent memory regions 130 in accordance with the above-described concurrently-control scheme, then the garbage collector 150 completes the corresponding garbage collection cycle by performing garbage collection on at least the targeted persistent memory region 130. As further disclosed herein, the garbage collection cycle may also include performing garbage collection on one or more of the dependent persistent memory regions 130, depending on whether these persistent memory region(s) 130 may be accessed in corresponding read-write mode(s), as further disclosed herein.

Figure 3:
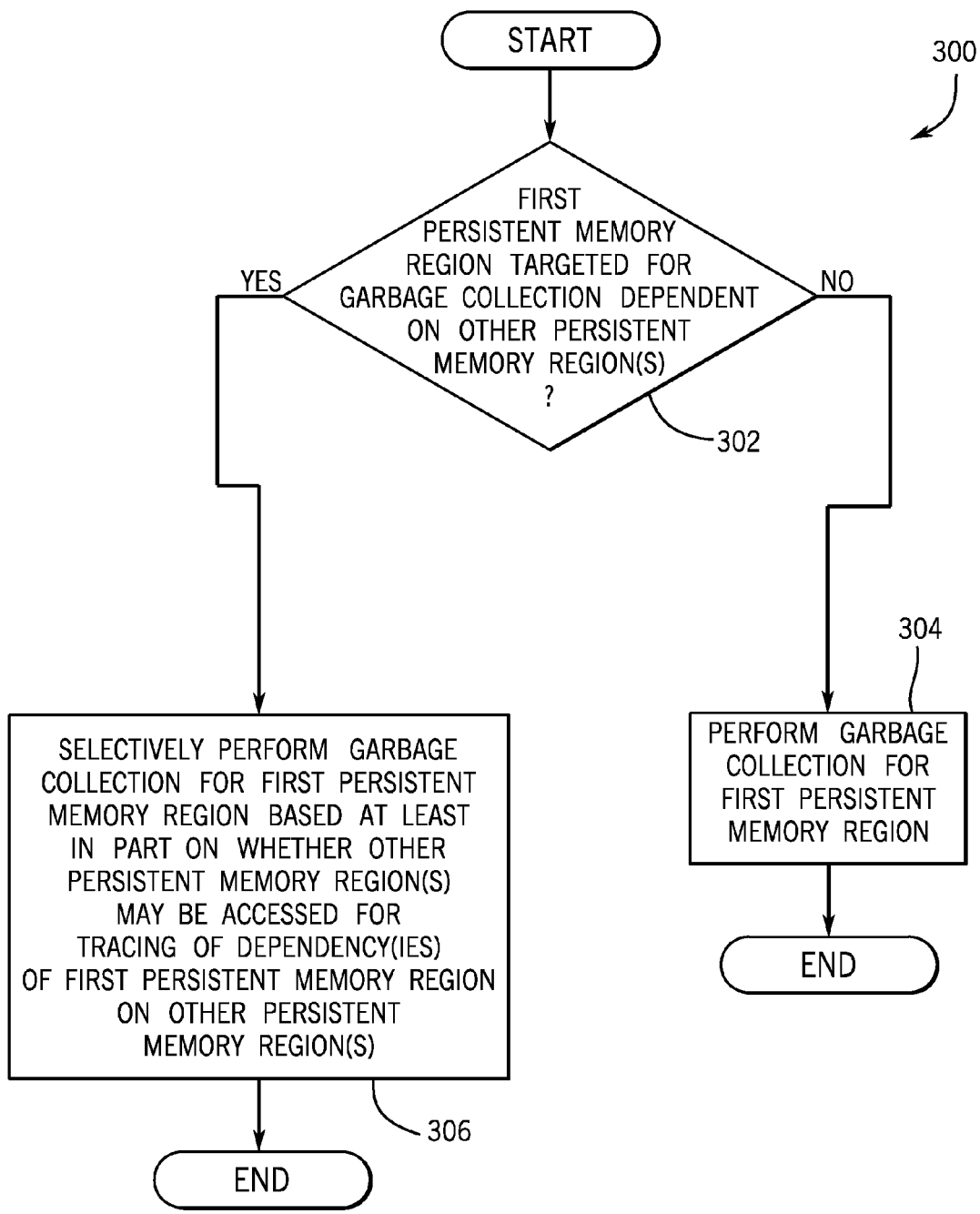
FIG. 3 is a flow diagram depicting a technique to perform garbage collection for dependent persistent memory regions according to an example implementation.

Referring to FIG. 3 in conjunction with FIG. 1, in accordance with example implementations, garbage collection may be performed on a targeted persistent memory region according to a technique 300. Pursuant to the technique 300, a determination is made, pursuant to decision block 302, whether a first persistent memory region that is targeted for garbage collection depends on one or multiple other persistent memory regions. If not, the technique 300 includes performing (block 304) garbage collection for the first persistent memory region. Otherwise, the technique 300 includes selectively performing garbage collection for the first persistent memory region based at least in part on whether one or multiple other persistent memory regions may be accessed for purposes of tracing the dependency(ies) of the first persistent memory region on the other persistent memory region(s), pursuant to block 306.

Figure 4:
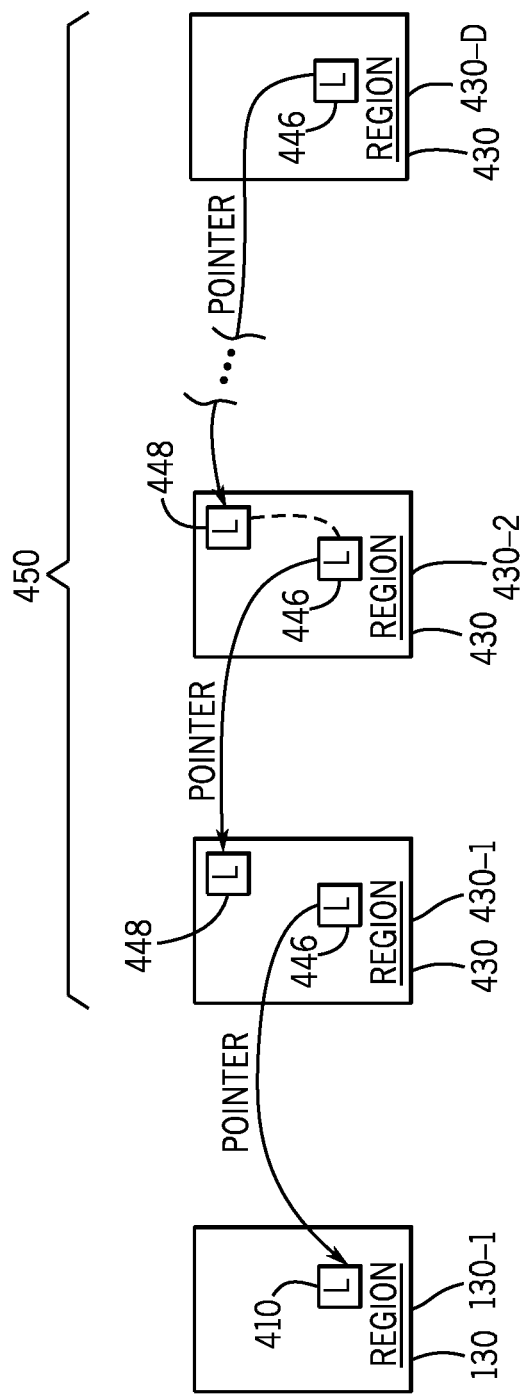
FIG. 4 is an illustration of dependent persistent memory regions of the persistent memory of FIG. 1, which are targeted by a garbage collection cycle according to an example implementation.

Referring to FIG. 4, to illustrate a specific example of garbage collection, in accordance with example implementations disclosed herein, a given persistent memory region 130-1 may be the target of a garbage collection cycle. For this example, the persistent memory region 130-1 depends on a set 450 of persistent memory regions, 430-1, 430-2 . . . 430-D. In this regard, a given location 410 of the persistent memory region 130-1, for this example, depends on the D persistent memory regions 430. More specifically, for the example of FIG. 4, the location 410 is pointed to by data contained in a memory region 446 of the persistent memory region 430-1, a region 448 of the persistent memory region 430-1 is pointed to by data contained in a memory region 446 of the persistent memory region 430-2, and so forth. Two locations within the same persistent memory region may be interdependent, as illustrated as an example by the dashed line between locations 446 and 448 of the persistent memory region 430-2. Moreover, although not depicted in FIG. 4, one or multiple other locations of the persistent memory region 130-1 may be pointed to by other dependent persistent memory regions, although this is not the case for this particular example.

In general, a persistent memory region 130, such as the persistent memory region 130-1, is deemed to depend on another persistent memory region, such as any of the persistent memory regions 430, if a location within the other persistent memory region 430 points to a location within the persistent memory region 130. The garbage collector 150 maintains inter-persistent memory region dependencies in metadata 134 (see FIG. 1) of the persistent memory 120 (see FIG. 1), in accordance with example implementations.

The determination of the dependencies, in accordance with example implementations, may be relatively conservative by using a scheme that captures all real dependencies as well as possibly capturing data improperly labeled as being an inter-persistent memory region pointer. For example, in cases where an integer is classified as a pointer, an additional dependency may be conservatively captured, where a dependency does not actually exist.

As depicted in FIG. 1, in accordance with example implementations, the metadata 134 may be stored in the persistent memory 120 at the same level as the persistent memory regions 130.

In accordance with example implementations, a given process updates the inter-persistent memory region dependencies by updating the metadata 134 before executing the corresponding instruction that introduces a given dependency. For example, if a given process stores an address A1, which resides in the persistent memory region 130-1 into a pointer, which resides in a dependent persistent memory region 430, then the process updates the metadata 134 to update the corresponding inter-persistent memory region dependency before executing the store instruction. If a process opens a persistent memory region in a read only mode, garbage collection is not performed by the process on that persistent memory region. Thus, for a given persistent memory region, the garbage collection poses no additional constraints on concurrent reader processes, in accordance with example implementations.

If a given process opens a persistent memory region 130 in a read-write mode, then garbage collection may be attempted by that process on the persistent memory region 130. If the persistent memory region 130 does not depend on any other persistent memory region, the garbage collection cycle within the process is limited to collecting that region's locations alone. This implies that if a location within the targeted persistent memory region 130 points to a location in another persistent memory region 130, that pointer may not be followed in the garbage collection process, in accordance with example implementations.

If a given persistent memory region depends on another persistent memory region, such as the persistent memory region 130-1 of FIG. 4 depending on one of the other persistent memory regions 430, then the garbage collector 150 (FIG. 1) attempts to perform garbage collection on the D persistent memory locations 430 on which the persistent memory region 130-1 is recursively dependent. If the garbage collector 150 is able to open and trace through all of the D dependent persistent memory regions 430, then the garbage collector 150 performs garbage collection on all D persistent memory regions 430. However, the above-described tracing may lead to concurrent access conflicts with other processes. Concurrent access is mediated using the locking scheme described earlier.

Figure 5:
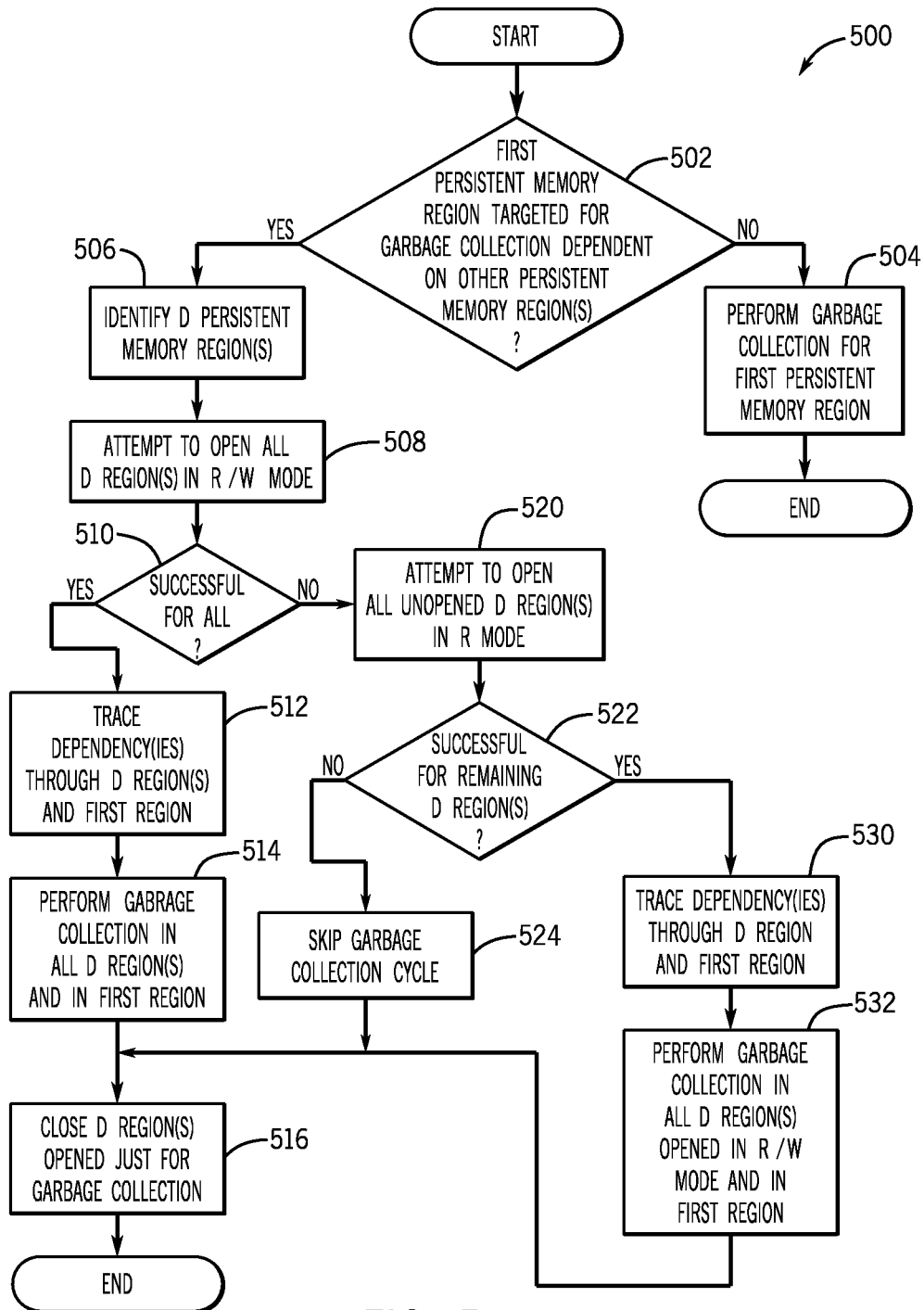
FIG. 5 is a flow diagram depicting a technique to perform persistent memory-based garbage collection according to a further example implementation.

For purposes of accommodating concurrent accesses to the persistent memory regions 130, the garbage collector 150 performs a technique 500, which is depicted in FIG. 5. Referring to FIG. 5 in conjunction with FIG. 1, in accordance with example implementations, the garbage collector 150 begins a given garbage collection cycle by determining (decision block 502) whether a first persistent memory region targeted for garbage collection depends on one or multiple other persistent memory regions. If so, the garbage collector 150 performs (block 504) garbage collection for the first persistent memory region and completes the garbage collection cycle. Otherwise, the garbage collector 150 identifies (block 506) the D dependent persistent memory region(s), pursuant to block 506 and attempts (block 508) to open each of these D region(s) in a read-write mode.

If the attempted opening of the D region(s) in the read-write mode is successful for all of the D region(s), as depicted in decision block 510, then the garbage collector 150 is able to perform garbage collection on the targeted, first persistent memory region, as well as perform garbage collection on the D dependent persistent memory region(s). More specifically, upon successfully opening all of the D persistent memory region(s) in the read-write mode, the garbage collector 150 traces (block 512) the dependency(ies) through the D persistent memory region(s) and the first persistent memory region and performs (block 514) garbage collection in all of the D dependent persistent memory region(s) and in the first persistent memory region. The garbage collector 150 then closes (block 516) the D persistent memory region(s), if any, which were open just for purposes of garbage collection.

If the garbage collector 150 determines (decision block 510) that all of the D dependent persistent memory region(s) were not successfully opened in the read-write mode, then the garbage collector 150 at least attempts to open the unsuccessfully-opened dependent persistent memory region(s) in order that tracing may be performed.

In this manner, pursuant to the technique 500, the garbage collector 150 attempts (block 520) to open all of the unopened, D dependent persistent memory region(s) in the read mode. If the garbage collector 150 makes a determination (decision block 522) that the attempt to open all of the unopened region(s) in the read mode was unsuccessful, then the garbage collector 150 skips (block 524) the garbage collection cycle and closes (block 516) all of the dependent persistent memory region(s), which were just opened for garbage collection.

Otherwise, if the garbage collector 150 is successful in opening all of the unopened D persistent memory region(s) in the read mode, then the garbage collector 150 traces (block 530) the dependency(ies) through the D dependent persistent memory region(s) and the first persistent memory region. Thereafter, the garbage collector performs (block 532) garbage collection in all of the D dependent persistent memory region(s), which were opened in the read-write mode and also performs garbage collection in the targeted, first persistent memory location. Subsequently, the garbage collector 150 closes (block 516) the D dependent persistent memory region(s), which were opened solely for purposes of garbage collection.

The garbage collection systems and techniques that are disclosed herein have the advantage of not changing the programmer's mental model of concurrent accesses of a persistent memory region. In this manner, the garbage collection cycles may be implemented, in accordance with example implementations, in a programmer-oblivious manner, with no visible effect, other than performance enhancement, in accordance with example implementations. This is achieved by having the underlying system automatically acquire and release read-write locks for opened persistent memory regions, as described herein. No two processes open a persistent memory region concurrently when at least one of the modes is a read-write mode, as disclosed herein, in accordance with example implementations, and this invariant remains unchanged in the presence of garbage collection, as described above.

More specifically, consider the situation in which two processes P1 and P2 open two persistent memory regions R1 and R2 respectively, both in read-write mode. If garbage collection of R1 involves tracing of R2 because of inter-PR dependencies, the garbage collector 150 skips garbage collection cycles for R1 until P2 closes R2. While this may affect memory usage in R1, it does not impact semantics. Consider another situation when process P1 opens persistent memory region R1 in read-write mode. If garbage collection of R1 involves tracing of persistent memory region R2, and R2 is opened in read-write or read only mode by P1's garbage collector, a subsequent attempt by another process P2 to open R2 may block until P1's garbage collection cycle is completed. Performance may be minimally affected, however, because a garbage collection cycle is usually short-lived and a persistent memory region open is not the most common operation.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
identifying a dependency between a first persistent memory region and at least one other persistent memory region; and
using a process having access to the first persistent memory region to selectively perform garbage collection for the first persistent memory region based at least in part on whether the process has access to the at least one other persistent memory region from which the first persistent memory region depends.

2. The method of claim 1, wherein using the process comprises tracing the dependency for each of the at least one other persistent memory region and using the tracing to perform the garbage collection for the first persistent region.

3. The method of claim 2, wherein the tracing comprises determining whether the process can acquire a lock for reading from and writing to the at least one other persistent memory region.

4. The method of claim 3, further comprising:
based at least in part on whether the process can acquire the lock for reading and writing, selectively performing a garbage collection for the at least one persistent memory region.

5. The method of claim 1, wherein
the first persistent memory region and the at least one other persistent memory region are part of a plurality of persistent memory regions;
a read lock is automatically acquired for a persistent memory region of the plurality of persistent memory regions opened in a read mode and a read-write lock is automatically acquired for a persistent memory region of the plurality of persistent memory regions opened in a read-write mode;
the process is part of a plurality of processes;
first and second processes of the plurality of processes are adapted to acquire respective read locks on a given persistent memory region of the plurality of persistent memory regions concurrently; and
the second process is adapted to wait for one of the read lock and the read-write lock on the given persistent memory region to be released in response to the combination of the first process previously acquiring the read lock on the given persistent memory region and the second process attempting to acquire the read-write lock on the given persistent memory region or the combination of the first process previously acquiring the read-write lock on the given persistent memory region and the second process attempting to acquire either the read lock or the read-write lock on the given persistent memory region.

6. The method of claim 1, further comprising:
using the process to selectively perform the garbage collection for the first persistent memory region based at least in part on whether the process can acquire a read lock or a read-write lock on at least one other persistent memory region.

7. The method of claim 1, wherein identifying the dependency comprises reading metadata updated by at least one application process accessing at least one of the first memory persistent region and the at least one other persistent memory region.

8. The method of claim 1, wherein
the first persistent memory region and the at least one other persistent memory region are part of a plurality of persistent memory regions and the first persistent memory region depends from a group of persistent memory regions of the plurality of persistent memory regions; and
using the process comprises using the process to perform garbage collection on the first persistent memory region in response to the process being able to open all of the group of persistent memory regions in a read mode, the method further comprising:
selectively performing garbage collection on a given persistent memory region of the group of persistent memory regions based at least in part on whether the given persistent memory region can be opened in read-write mode.

9. A system comprising:
a persistent memory comprising a first persistent memory region and at least one other persistent memory region from which the first persistent memory region depends; and
a garbage collector comprising a processor and being associated with a process to access the first persistent memory region, the garbage collector to access the at least one other persistent memory region to trace at least one dependency of the first persistent memory region to the at least one other persistent memory region and perform garbage collection for the first persistent memory region.

10. The system of claim 9, wherein the garbage collector is adapted to identify the at least one dependency by reading metadata stored in a non-volatile memory.

11. The system of claim 9, wherein
the first persistent memory region and the at least one other persistent memory region are part of a plurality of persistent memory regions;
a read lock is automatically acquired for a persistent memory region of the plurality of persistent memory regions opened in a read mode and a read-write lock is automatically acquired for a persistent memory region of the plurality of persistent memory regions opened in a read-write mode;
the process is part of a plurality of processes;
first and second processes of the plurality of processes are adapted to acquire read locks on a given persistent memory region of the plurality of persistent memory regions concurrently; and
the second process is adapted to wait for one of the read lock and the read-write lock on the given persistent memory region to be released in response to the combination of the first process previously acquiring the read lock on the given persistent memory region and the second process attempting to acquire the read-write lock on the given persistent memory region or the combination of the first process previously acquiring the read-write lock on the given persistent memory region and the second process attempting to acquire either the read lock or the read-write lock on the given persistent memory region.

12. The system of claim 9, wherein:
the first persistent memory region and the at least one other persistent memory region are part of a plurality of persistent memory regions and the first persistent memory region depends from a group of persistent memory regions of the plurality of persistent memory regions; and
the garbage collector is adapted to:
perform garbage collection on the first persistent memory region in response to the garbage collector being able to open all of the persistent memory regions of the group of persistent memory regions in a read mode; and
selectively perform garbage collection on a given persistent memory region of the group of persistent memory regions based at least in part on whether the given persistent memory region can be opened in a read-write mode.

13. The system of claim 9, wherein the persistent memory comprises a non-volatile memory.

14. The system of claim 9, wherein the processor comprises a central processing unit.

15. An article comprising a non-transitory computer readable storage medium to store instructions that when executed by a computer cause the computer to:
identify a dependency between a first persistent memory region and at least one other persistent memory region from which the first persistent memory region depends; and
use a process having access to the first persistent memory region to selectively perform garbage collection for the first persistent memory region based at least in part on whether the process has access to the at least one other persistent region.

16. The article of claim 15, the storage medium storing instructions that when executed by the computer cause the computer to trace the dependency for each of the at least one other persistent memory region and use the tracing to perform the garbage collection for the first persistent region.

17. The article of claim 16, the storage medium storing instructions that when executed by the computer cause the computer to determine whether the process can acquire a lock for reading from and writing to the at least one other persistent memory region.

18. The article of claim 17, the storage medium storing instructions that when executed by the computer cause the computer to, based at least in part on whether the process can acquire the lock for reading and writing, selectively perform a garbage collection for the at least one persistent memory region.

19. The article of claim 16, the storage medium storing instructions that when executed by the computer cause the computer to determine whether the process can acquire a lock for reading from the at least one other persistent memory region.

20. The article of claim 16, the storage medium storing instructions that when executed by the computer cause the computer to, based at least in part on whether the process can acquire the lock for reading from the at least one other persistent memory region, determine whether to skip the garbage collection.

* * * * *